(12) United States Patent
Chan et al.

(10) Patent No.: US 8,659,553 B1
(45) Date of Patent: *Feb. 25, 2014

(54) ORIENTATION-BASED TOUCHSCREEN DISPLAY

(75) Inventors: Michael Chan, San Francisco, CA (US); Nicholas J. Pelly, San Francisco, CA (US)

(73) Assignee: Google Inc., Mountain View, CA (US)

( * ) Notice: Subject to any disclaimer, the term of this patent is extended or adjusted under 35 U.S.C. 154(b) by 570 days.

This patent is subject to a terminal disclaimer.

(21) Appl. No.: 12/886,385

(22) Filed: Sep. 20, 2010

(51) Int. Cl.
*G09G 5/00* (2006.01)
*G06F 3/041* (2006.01)

(52) U.S. Cl.
USPC .......................................... 345/169; 345/173

(58) Field of Classification Search
None
See application file for complete search history.

(56) References Cited

U.S. PATENT DOCUMENTS

| | | | |
|---|---|---|---|
| 6,597,384 B1 | 7/2003 | Harrison | |
| 2003/0206394 A1 | 11/2003 | Ossia | |
| 2006/0197753 A1* | 9/2006 | Hotelling | 345/173 |
| 2008/0059888 A1 | 3/2008 | Dunko | |
| 2009/0207134 A1 | 8/2009 | Spilo | |
| 2010/0022275 A1* | 1/2010 | Shu | 455/566 |
| 2010/0069115 A1* | 3/2010 | Liu | 455/556.1 |
| 2010/0138780 A1 | 6/2010 | Marano et al. | |

OTHER PUBLICATIONS

Office Action from U.S. Appl. No. 13/249,236, dated Nov. 18, 2011, 15 pp.
Response to Office Action dated Nov. 18, 2011, from U.S. Appl. No. 13/249,236, filed Feb. 16, 2012 13 pp.
AnyRemote, accessed Mar. 28, 2010, 3 pp., http://anyremote.sourceforge.net/.
TouchPad, 2009, 2 pp., http://www.edovia.com-touchpad.
Sony Ericsson K610i Additional Information, Internet version of the user's guide, 2006, 101 pp. http://www.sonyericsson.com/cws/download/1/235/301/1193014218/K610i UG_R1A_ENZHZT.pdf.
Office Action from U.S. Appl. No. 13/249,236, dated Apr. 5, 2012, 17 pgs.
Response to Office Action dated Apr. 5, 2012, from U.S. Appl. No. 13/249,236, filed Jun. 5, 2012, 13 pp.

* cited by examiner

*Primary Examiner* — Claire X Pappas
*Assistant Examiner* — Duane N Taylor, Jr.
(74) *Attorney, Agent, or Firm* — Shumaker & Sieffert, P.A.

(57) ABSTRACT

A touchscreen device may display various graphical user interfaces (GUIs) based on a physical orientation of the touchscreen device and a context of an application executed by an external device, to control the external device. In one example, a touchscreen device includes a touchscreen, an orientation sensor to determine a physical orientation for the touchscreen device, a context determination unit to determine a context for an application, a computer-readable medium configured to store configuration data associating combinations of contexts for applications and orientations in which the touchscreen device can be physically positioned with respective GUIs, a control unit that receives the orientation in which the touchscreen device is physically positioned and the context, selects the GUI associated with the determined orientation and the context, and causes the touchscreen to display the selected GUI, and an external device interface configured to send input received via the touchscreen to an external device.

19 Claims, 7 Drawing Sheets

ORIENTATION-BASED TOUCHSCREEN DISPLAY

TECHNICAL FIELD

This disclosure relates to mobile devices such as, for example, cellular telephones.

BACKGROUND

Mobile devices such as cellular telephones have become prominent. Many cellular telephones include devices such as accelerometers to detect motion of the cellular telephone and touchscreens for displaying graphical user interfaces and receiving user input.

SUMMARY

In one example, a method includes determining a physical orientation of a touchscreen device and determining a context for an application executed by an external device to which the touchscreen device is communicatively coupled, wherein the context corresponds to information that is generated based on a user's interaction with the application. When the touchscreen device is physically oriented in a first orientation and when the context comprises a first context, the method includes displaying, by the touchscreen device, a first graphical user interface configured to receive a first type of user input and upon receiving user input of the first type, providing the received user input of the first type to the external device. When the touchscreen device is physically oriented in a second, different orientation and when the context comprises a second context, the method includes displaying, by the touchscreen device, a second, different graphical user interface configured to receive a second, different type of user input and upon receiving user input of the second type, providing the received user input of the second type to the external device.

In another example, a touchscreen device includes a touchscreen, an orientation sensing unit configured to determine a physical orientation of the touchscreen device, a context determination unit configured to determine a context of an application executed by an external device to which the touchscreen device is communicatively coupled, wherein the context corresponds to information that is generated based on a user's interaction with the application, a computer-readable medium configured to store configuration data that associates a number of orientations in which the touchscreen device can be physically oriented and contexts for one or more applications executed by the external device with respective graphical user interfaces, a control unit configured to receive from the orientation sensing unit the determined orientation of the touchscreen device and to receive the context for the application executed by the external device, and means for selecting the graphical user interface that is associated with the determined orientation and the context for the application. The control unit is configured to cause the touchscreen to display the selected graphical user interface associated with the determined orientation and the context for the application. The touchscreen device also includes an external device interface configured to send input received via the selected graphical user interface displayed on the touchscreen to the external device.

In another example, a computer-readable storage medium contains, e.g., is encoded with, instructions that, when executed, cause a processor of a touchscreen device to determine a physical orientation for the touchscreen device, determine a context for an application executed by an external device to which the touchscreen device is communicatively coupled, wherein the context corresponds to information that is generated based on a user's interaction with the application, when the touchscreen device is physically oriented in a first orientation and when the context comprises a first context, cause a touchscreen of the touchscreen device to display a first graphical user interface configured to receive a first type of user input and upon receiving user input of the first type, the instructions cause the processor to provide the received user input of the first type to the external device, and when the touchscreen device is physically oriented in a second, different orientation and when the context comprises a second context, cause the touchscreen to display a second, different graphical user interface configured to receive a second, different type of user input and upon receiving user input of the second type, the instructions cause the processor to provide the received user input of the second type to the external device.

The techniques of this disclosure may provide one or more advantages. For example, the techniques of this disclosure may allow a touchscreen device, such as a cellular telephone, to act as both a keyboard and a mouse, depending on an orientation of the device and a context for an application controlled by the touchscreen device. The touchscreen device may automatically switch between acting as a keyboard and as a mouse when the device is rotated between portrait and landscape physical orientations, such that a user may switch the use of the touchscreen device between a keyboard and a mouse simply by rotating the device. Likewise, in other examples, other input modes may be associated with other physical orientations of the touchscreen device.

The details of one or more examples are set forth in the accompanying drawings and the description below. Other features, objects, and advantages will be apparent from the description and drawings, and from the claims.

DETAILED DESCRIPTION

In general, this disclosure is directed to techniques for using a touchscreen device, e.g., a mobile phone, as an input interface for a separate device, such as a personal computer. As an example, a cellular phone with a touchscreen may be communicatively coupled to a computer via Bluetooth®. The touchscreen device may operate in various input modes based on an orientation in which the touchscreen device is held and a context of the separate device. For example, the touchscreen device may operate both as a keyboard and as a mouse for the separate device, depending on the orientation in which the device is held and a context for the separate device. The context for the separate device may relate to, e.g., an identifier for the application or the type of application being executed (e.g., an Internet browser, a game, etc.), a state of the application (e.g., whether the application is initializing or at a particular state that requires a particular type of input), a state of an operating environment or execution environment in which the application executes, such as the position of a pointer on a graphical display for the application, or other context information For example, when held in a landscape orientation, and when a pointer is positioned over a text field of a graphical user interface, the touchscreen device may operate as a keyboard, and when held in a portrait orientation, the touchscreen device may operate as a pointer controlling device, such as a mouse or trackpad.

The touchscreen device may be configured with an orientation sensor, such as an accelerometer, to determine the orientation in which the device is held. The touchscreen device may be rotated into a landscape orientation, and in response to a signal from the sensor that the touchscreen device has been oriented in the landscape orientation, display a keyboard and await input from a user. When the user selects one of the keys, the touchscreen device may transmit a signal to a communicatively coupled device (e.g., a computing device) as to which key was selected.

The touchscreen device may further be configured with context definitions for various types of applications that can be executed by an external device. For example, the external device may execute an Internet browser. The touchscreen device may be configured to receive an indication from the external device that the Internet browser is being executed, and context information for the Internet browser. Code for a web page to be displayed by the Internet browser may indicate that a text field is to be displayed to retrieve textual input or a field to retrieve numeric input. The context information may therefore include an indication of whether the pointer is positioned over the text field or the field to retrieve numeric input.

In response to a signal from the sensor that the touchscreen device has been positioned in a portrait orientation, the touchscreen device may display crosshairs or another indication that the touchscreen device may be used as a pointer controller. The touchscreen device may then receive input for controlling a pointer based on relative positions of the touchscreen selected by the user being mapped to a corresponding position of a display of the coupled device. In other examples, directional movement received by the touchscreen device may be mapped to pointer movements, e.g., a slide of the user's finger to the right may be mapped to one or more incremental "move right" signals sent to the computing device.

In some examples, the sensor is periodically polled to determine whether the orientation has changed. In some examples, when the motion sensor determines that the touchscreen device has been placed in a different orientation, the sensor may send an interrupt command that causes the touchscreen device to display a different input interface, based on the new orientation. The touchscreen device may also retrieve a context for the application being executed by the external device to determine whether to change the input interface displayed by the touchscreen device in response to the change in orientation. For example, if a pointer is positioned over a text field when the touchscreen device is rotated to a landscape orientation, the touchscreen device may display a keyboard. As another example, if the pointer is positioned over a field for receiving numeric input when the touchscreen device is rotated to the landscape orientation, the touchscreen device may display a numeric keypad.

Figure 1:
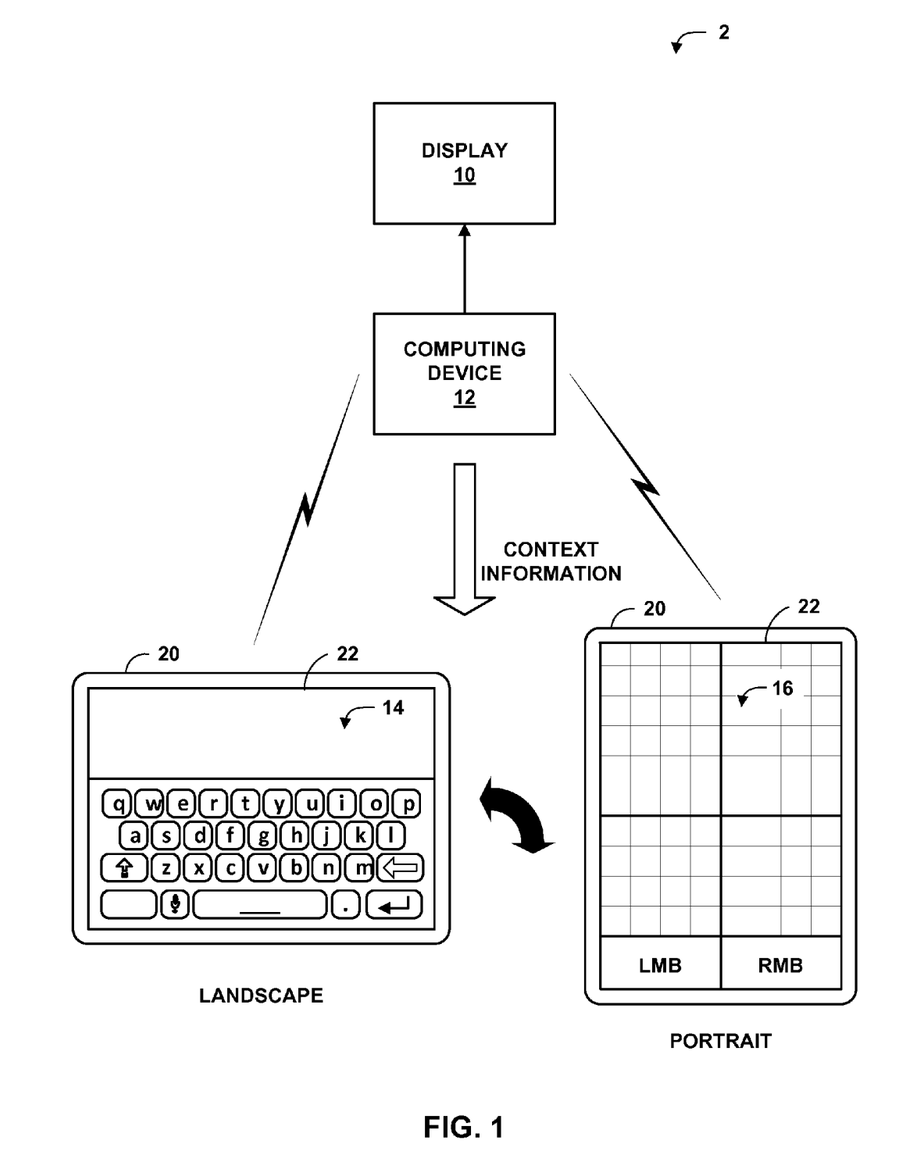
FIG. 1 is a block diagram illustrating an example system in which a mobile device displays various graphical user interfaces (GUIs) based on a physical orientation of the mobile device.

FIG. 1 is a block diagram illustrating an example system 2 in which mobile device 20 displays various graphical user interfaces (GUIs) based on a physical orientation for mobile device 20, e.g., an orientation in which mobile device 20 is physically positioned, and a context for an application executed by an external device, e.g., computing device 12. In the example of FIG. 1, system 2 includes display 10, computing device 12, and mobile device 20. Mobile device 20 may comprise, for example, a cellular telephone, personal digital assistant (PDA), smartphone, or the like. Mobile device 20 includes touchscreen 22 in the example of FIG. 1, and may therefore be referred to as a "touchscreen device." In other examples, mobile device 20 may comprise any other mobile device that includes a touchscreen, such as, for example, a global positioning system (GPS) unit, a tablet computer, a laptop with a touchscreen, or other such devices. Mobile device 20 may be communicatively coupled to computing device 12 to provide input to computing device 12, in accordance with the techniques of this disclosure.

Computing device 12 is communicatively coupled to display 10. Display 10 may comprise, for example, a television, a computer monitor, a touchscreen, a laptop monitor, a projector, or other display. Computing device 12 may comprise an output interface, such as a video card, to provide data to display 10 to cause display 10 to display data for computing device 12. In some examples, computing device 12 may be coupled to the Internet via a network interface card (NIC) and/or network access device (not shown) such as, for example, a telephonic modulator/demodulator (modem), a cable modem, a digital subscriber line (DSL) modem, a wireless or wired router or switch, or other network access device.

Display 10 may form part of a user interface for computing device 12. Other user interface devices for computing device 12 may include, for example, a keyboard, a mouse, speakers, a printer, a microphone, a camera, a light pen or stylus, or other user interface devices. Mobile device 20 may also be configured to act as a user interface for computing device 12. For example, mobile device 20 may be configured to act as a keyboard and/or mouse for computing device 12 based on a physical position in which mobile device 20 is held and a context of an application executed by computing device 12. In general, the relevant application may correspond to the application prominently displayed on display 10 by computing device 12. For example, the application may correspond to the application that currently has focus as displayed on display 10. The context may correspond to either or both of an execution state of the application and/or a state of an operating environment, e.g., an operating system, in which the application is executing.

In the example of FIG. 1, when in a landscape orientation and when the application is in an appropriate context, mobile device 20 presents a keyboard graphical user interface (GUI) 14 on touchscreen 22. The context may be appropriate for a keyboard GUI when a pointer displayed on display 10 by computing device 12 is positioned over a text field. In some examples, the context may be appropriate when a text field has been selected, e.g., when a cursor is displayed in the text field such that textual input received by computing device 12 would be displayed in the text field.

On the other hand, in this example, when in a portrait orientation, mobile device 20 presents a trackpad GUI 16. Mobile device 20 may present trackpad GUI 16 regardless of application context when mobile device 20 is in the portrait orientation. Trackpad GUI 16, in this example, provides a trackpad area in which a user may swipe his or her fingers to move a pointer, as well as left mouse button (LMB) and right mouse button (RMB) areas that the user may select to "click" a left or right mouse button, respectively. In general, the techniques of this disclosure are directed to determining a physical orientation for a touchscreen device and displaying a GUI based on the determined orientation. Thus in other examples, mobile device 20 may be configured to present other GUIs when held in portrait or landscape orientations and based on other contexts for applications executed by computing device 12.

Other orientations (such as reverse landscape, reverse portrait, positioning mobile device 20 flat, upright, or on an incline, and the like) along with other contexts may be mapped to other GUIs, such as, for example, an interface for using a camera of mobile device 20 and providing captured images to computing device 12, an interface for receiving finger or stylus based input that converts received images to corresponding alphanumeric characters and sends the characters as input to computing device 12, a configuration interface for adjusting settings of computing device 12 such as, for example, image settings including brightness, contrast, screen size, and gamma correction for display 10, or other interfaces or input modes.

In some examples, mobile device 20 may be used as a mouse while positioned flat, that is, while touchscreen 22 faces up and away from the ground. In such examples, touchscreen device 22 may display a left mouse button and a right mouse button. A user may physically manipulate mobile device 20 as if mobile device 20 were a traditional mouse coupled to a keyboard. For example, mobile device 20 may include one or more motion sensing units, such as accelerometers and/or gyroscopes, that may translate physical, planar movements into mouse movements. In this manner, while held in a flat orientation, mobile device 20 may provide an input mode to act as a mouse in which a user may physically manipulate mobile device 20 as if mobile device 20 were a mouse, and "click" left and/or right mouse buttons by selecting regions of a GUI displayed by touchscreen 22.

In this manner, a user may provide input to computing device 12 via mobile device 20 based on an orientation in which the user physically positions (e.g., holds) mobile device 20 and based on a context of an application executed by computing device 12. In the example of FIG. 1, the user may enter alphanumeric input for computing device 12 by holding mobile device 20 in a landscape orientation, assuming an appropriate context, and interacting with keyboard GUI 14, or manipulate a pointer using trackpad GUI 16 by holding mobile device 20 in a portrait orientation. Thus mobile device 20 may function as either a keyboard or mouse for computing device 12, based on the orientation in which mobile device 20 is held and the context of the application executed by computing device 12, according to the specific example of FIG. 1. As noted above, in other examples, mobile device 20 may be held in other orientations, determine other contexts for applications executed by computing device 12, and these other orientations and contexts may be mapped to other input types.

Mobile device 20 may include an accelerometer and/or gyroscope to determine a physical orientation for mobile device 20. In other examples, mobile device 20 may determine the orientation in which mobile device 20 is physically positioned in other ways, such as by using other types of motion sensors. In some examples, mobile device 20 may receive an indication of a physical orientation for mobile device 20 from computing device 12. For example, computing device 12 may include a camera or other sensor that detects the orientation of mobile device 20 and may send a signal to mobile device 20 as to the physical orientation for mobile device 20.

Mobile device 20 may communicate with computing device 12 in any of a variety of ways (e.g., wireless or wired communication). For example, mobile device 20 may include a Bluetooth interface that may be synchronized with a Bluetooth interface of computing device 12. In such examples, mobile device 20 may communicate data received via touchscreen 22 to computing device 12 via Bluetooth Human Interface Device Profile (Bluetooth HID) protocol. Bluetooth HID provides a mechanism for encapsulating data for the Human Interface Device protocol defined for Universal Serial Bus (USB) devices, such as for keyboard and mouse input.

Accordingly, with respect to the example of FIG. 1, when mobile device 20 is held in the landscape orientation, mobile device 20 may translate selected regions of touchscreen 22 to particular keyboard keys and transmit corresponding Bluetooth HID keyboard messages to computing device 12, assuming an appropriate context for an application executed by computing device 12. Likewise, when mobile device 20 is held in the portrait orientation, mobile device 20 may translate selected regions or motions received by touchscreen 22 to mouse movements or buttons (e.g., selections or "clicks" of a left or right mouse button) and transmit corresponding Bluetooth HID mouse messages to computing device 12. In other examples, mobile device 20 may communicate with computing device 12 using other wireless or wired communication protocols.

In some examples, mobile device 20 may implement an "auto-complete" algorithm that provides suggestions as a user is typing of words that may be the word the user is typing. In such examples, when held in landscape mode, mobile device 20 may provide auto-complete suggestions to the user via GUI 14. Accordingly, the user may select one of the auto-complete suggestions or continue typing the full word, or an additional portion of the word to see additional and/or alternative auto-complete suggestions. Upon receiving a selection of an auto-complete suggestion, mobile device 20 may transmit the characters of the suggested word to computing device 12.

Figure 2:
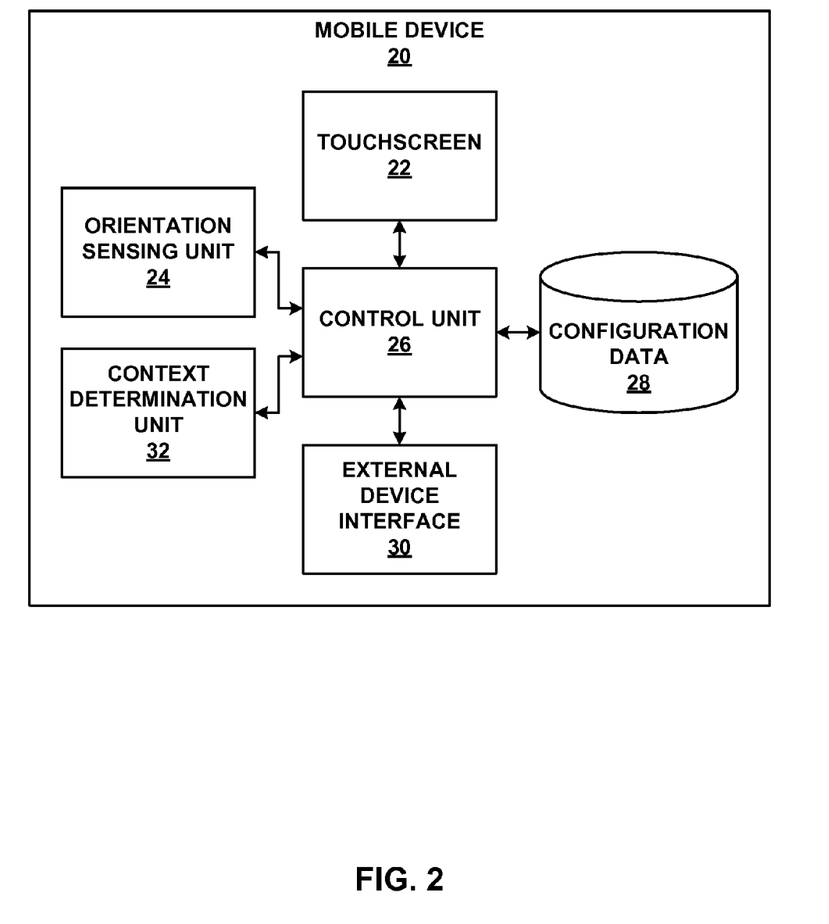
FIG. 2 is a block diagram illustrating an example set of components of a mobile device.

FIG. 2 is a block diagram illustrating an example set of components of mobile device 20. In the example of FIG. 2, mobile device 20 includes touchscreen 22, orientation sensing unit 24, control unit 26, configuration data 28, external device interface 30, and context determination unit 32. Control unit 26 may comprise one or more processing units such as, for example, one or more microprocessors, application-specific integrated circuits (ASICs), field programmable gate arrays (FPGAs), digital signal processors (DSPs), or other similar processing circuitry. Control unit 26 may further comprise a computer-readable storage medium encoded with instructions that, when executed, cause control unit 26 to perform the functions attributed to control unit 26.

Orientation sensing unit 24 may be configured to determine a physical orientation for mobile device 20. In some examples, orientation sensing unit 24 may comprise an accelerometer, gyroscope, or other motion sensor. Control unit 26 may periodically send requests to orientation sensing unit 24 for an indication of a current orientation of mobile device 20.

In other examples, orientation sensing unit 24 may send interrupt signals or messages to control unit 26, e.g., when orientation sensing unit 24 determines that mobile device 20 has been physically positioned in a new orientation.

Context determination unit 32 may be configured to determine a context for an application executed by an external device, such as computing device 12 (FIG. 1). Context information may include a type of application being executed, a state of the application, a state of an operating environment, such as the position of a pointer with respect to a GUI for the application, a type of input field displayed by the GUI (e.g., text or numeric), a tool or menu of the application previously selected by a user, or other such context information. Context determination unit 32 may request context information for an application executed by computing device 12 to determine the context, and provide the context information to control unit 26. In this manner, context determination unit 32 may determine a context for an application executed by computing device 12 based on a user's interaction with the application.

Control unit 26 may maintain configuration data 28. Configuration data 28 may correspond to data stored on a computer-readable storage medium of mobile device 20, and may be arranged in the form of a database or file system. Configuration data 28 may associate orientations in which mobile device 20 may be physically positioned and contexts of various applications that can be executed by an external device, such as computing device 12, with particular GUIs or input modes of mobile device 20. In some examples, an entry of configuration data 28 may specify a wildcard for orientation or context, such that any orientation of mobile device 20 in combination with a particular context can be associated with a particular GUI, or any context for an application in combination with a particular orientation can be associated with a particular GUI. For example, an entry of configuration data 28 may combine the portrait orientation with a wildcard value for context, and associate this combination with a trackpad GUI, such that mobile device 20 acts as a mouse when held in the portrait orientation, regardless of the context for the application executed by computing device 12. Accordingly, configuration data 28 may store associations between states of applications, resulting from user interactions with the applications and orientations in which mobile device 20 can be physically positioned, with particular GUIs.

In this manner, control unit 26 may determine a current orientation in which mobile device 20 is physically positioned using orientation sensing unit 24, determine a context for a current application executed by an external device using context determination unit 32, and then determine a GUI to be displayed based on the orientation and the context using configuration data 28. Control unit 26 may then cause touchscreen 22 to display the GUI corresponding to the current orientation in which mobile device 20 is physically positioned and the context of the application executed by the external device.

External device interface 30 may comprise an interface for sending and/or receiving input to and/or from computing device 12. External device interface 30 may comprise an interface specific to computing device 12, or a general purpose interface that may be configured to communicate with computing device 12 and/or other external devices. External device interface 30 may comprise, for example, a Bluetooth interface, a universal serial bus (USB) interface, a micro-USB interface, a mini-USB interface, a FireWire interface, a network interface, or other interface (e.g., other wireless interface) capable of exchanging data with computing device 12.

In this manner, control unit 26 may determine a current orientation for mobile device 20 and cause touchscreen 22 to display a GUI corresponding to the orientation and the context of the application executed by the external device, based on configuration data 28. When touchscreen 22 receives input via the displayed GUI, touchscreen 22 may provide the input to control unit 26, which may in turn process the input and provide the input to external device interface 30. For example, when a user touches touchscreen device 22, touchscreen device 22 may determine coordinates of the selected (that is, touched) region and send an indication of the selected region to control unit 26.

Control unit 26 may determine what was selected based on the coordinates and the displayed GUI. For example, when displaying a keyboard GUI in a landscape orientation, control unit 26 may determine an alphanumeric value corresponding to a selected region. As another example, when displaying a trackpad GUI in a portrait orientation, control unit 26 may determine horizontal and vertical movements, mouse-wheel-up and mouse-wheel-down movements, and/or left or right mouse button selections corresponding to selected regions or movement of a user's finger across touchscreen 22. After receiving such input, control unit 26 may coordinate output of the input to computing device 12 via external device interface 30.

Control unit 26 may provide one or more values representative of the user's selection to external device interface 30. External device interface 30 may, in turn, encapsulate the values according to a particular protocol (e.g., the HID protocol and/or the Bluetooth protocol) and send the encapsulated values to computing device 12. In addition, control unit 26 may configure external device interface 30 to communicate with computing device 12, and/or other external devices. For example, control unit 26 may cause external device interface 30 to synchronize with computing device 12 in accordance with the synchronization procedure specified by the Bluetooth protocol, when external device interface 30 and computing device 12 communicate via Bluetooth.

Figure 3:
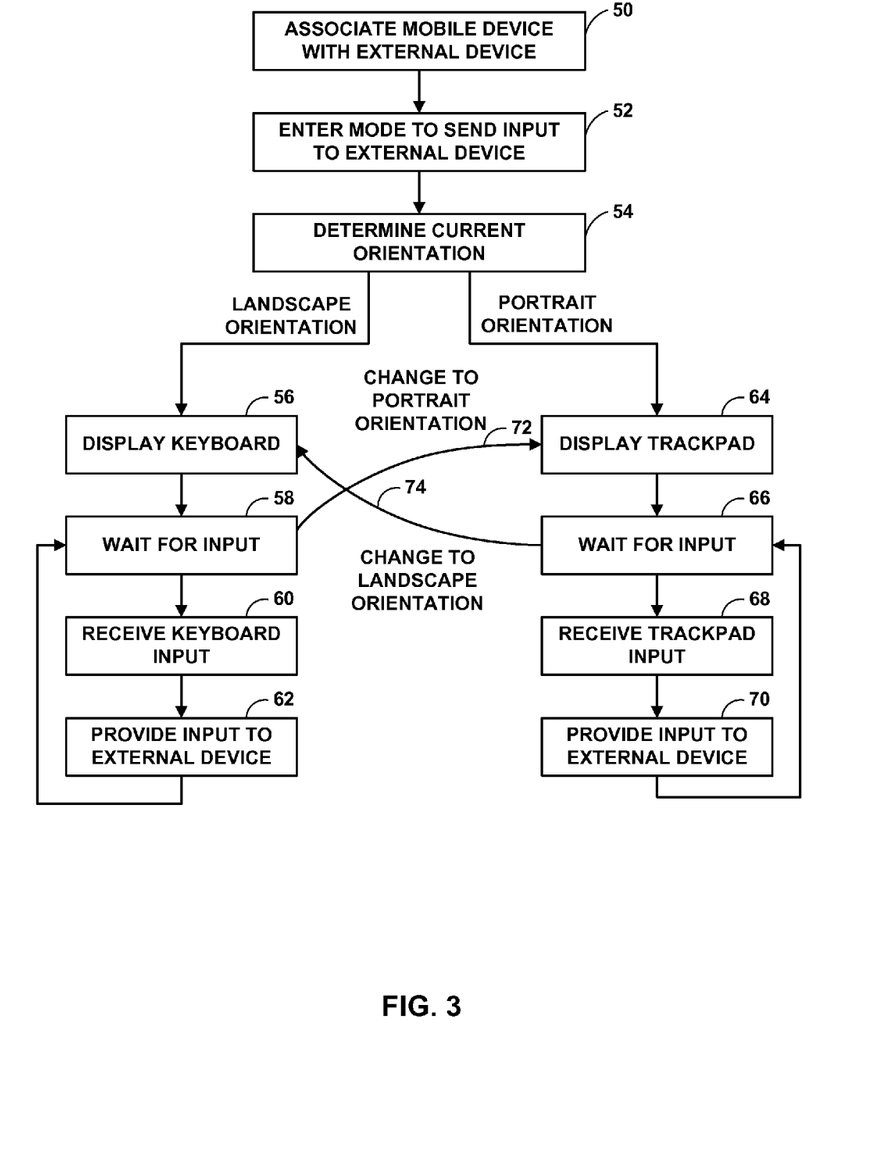
FIG. 3 is a flowchart illustrating an example method for displaying various GUIs based on an orientation of a touchscreen device and sending input received by one of the GUIs to an external device.

FIG. 3 is a flowchart illustrating an example method for displaying various GUIs based on an orientation of a touchscreen device and sending input received by one of the GUIs to an external device. FIG. 3 also illustrates that, at any time, a user may rotate the touchscreen device between various physical positions, and the touchscreen device may respond by changing to a different GUI based on the new orientation of the touchscreen device. Although illustrated with respect to the examples of portrait mode corresponding to a trackpad GUI and landscape mode corresponding to a keyboard GUI, it should be understood that the techniques of this disclosure may generally correspond to determining any orientation in which a touchscreen device is physically positioned and selecting any GUI corresponding to that orientation. While the method of FIG. 3 is discussed with respect to the example of mobile device 20 of FIGS. 1 and 2, it should be understood that the method may be carried out by other touchscreen devices and/or mobile devices as well.

In the example of FIG. 3, mobile device 20 may first be associated with an external device, such as computing device 12 (FIG. 1) (50). For example, mobile device 20 may synchronize with computing device 12, in accordance with the synchronization procedure of the Bluetooth protocol. Mobile device 20 may then enter a mode in which mobile device 20 is configured to send input to computing device 12 (52). For example, mobile device 20 may be configured with an application that allows a user to send input to an external device, such as computing device 12, using the techniques of this disclosure. The user may select an option to begin executing the application in order to enter the mode. In this example, mobile device 20 may include configuration data that associates the landscape orientation with a keyboard GUI and the portrait orientation with a trackpad GUI.

Mobile device 20 may then determine in which orientation it is currently physically positioned (54). When mobile device 20 is initially physically positioned in the landscape orientation, mobile device 20 may initially display a keyboard GUI, such as that illustrated in the example of FIG. 1 (56). Mobile device 20 may then await user input while displaying the keyboard (58). When the user provides input, e.g., by selecting a region of touchscreen 22, mobile device 20 may receive the input (60) and provide the input to computing device 12 (62). That is, mobile device 20 may interpret the selected region of touchscreen 22 to determine a key of the keyboard GUI selected by the user and provide a value indicative of the selected key to computing device 12, e.g., encapsulated according to an HID protocol such as the Bluetooth HID protocol.

On the other hand, when mobile device 20 is initially physically positioned in the portrait orientation, mobile device 20 may initially display a trackpad GUI, such as that illustrated in the example of FIG. 1 (64). The trackpad GUI may further include GUI objects such as, for example, mouse buttons (e.g., left and/or right mouse buttons), a mouse wheel area or scroll buttons, or other GUI objects associated with a trackpad or mouse. Mobile device 20 may then await user input (66). When the user provides input, e.g., by moving a finger across the trackpad or tapping the trackpad or GUI objects representative of mouse buttons, mobile device 20 may receive the input (68) and provide the input to computing device 12 (70). Mobile device 20 may translate movements across the trackpad GUI into horizontal and/or vertical mouse movements or mouse wheel scroll movements (e.g., to scroll up or down), and may translate taps into left and/or right mouse button presses.

At any time while waiting for input (58, 66), the user may rotate mobile device 20 to a new orientation. For example, while waiting for input (58) and displaying the keyboard GUI, mobile device 20 may be rotated into the portrait orientation (72), in which case, in this example, mobile device 20 may begin displaying the trackpad GUI (64) and awaiting input (66). In some examples, mobile device 20 may also determine a context for an application executed by the external device, and display the trackpad GUI when the context and the orientation are associated with the trackpad GUI. Similarly, while waiting for input (66) and displaying the trackpad GUI, mobile device 20 may be rotated into the landscape orientation (74), in which case, in this example, mobile device 20 may begin displaying the keyboard GUI (56) and awaiting input (58). Again, mobile device 20 may determine a context for the application and display the keyboard GUI when changed to landscape orientation and when the context is appropriate, e.g., a pointer is positioned over a text field or a text field has been selected.

Figure 4:
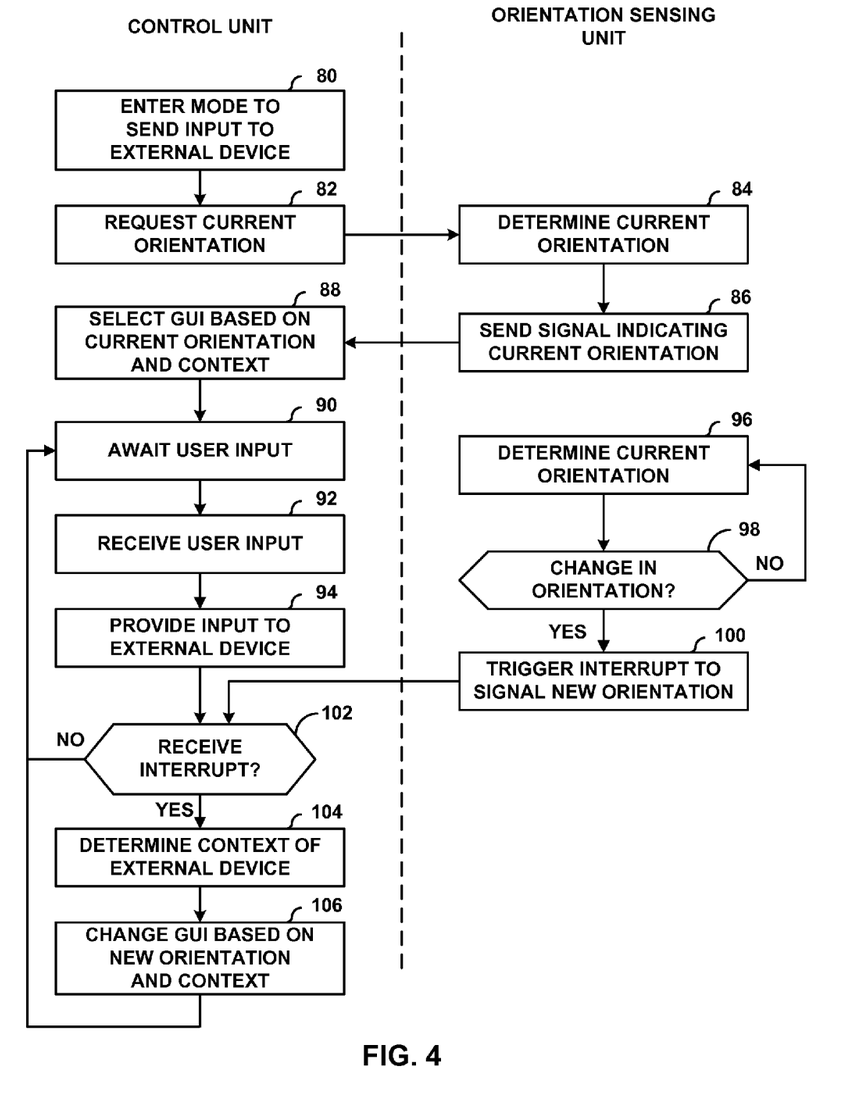
FIG. 4 is a flowchart illustrating an example method for changing a GUI displayed by a touchscreen device when the touchscreen device has changed orientations soon after having received user input.

FIG. 4 is a flowchart illustrating an example method for changing a GUI displayed by a touchscreen device when the touchscreen device has changed orientations soon after having received user input. Initially, control unit 26 (FIG. 2) may enter a mode to send input to an external device (80), e.g., in response to a request from a user to execute an application for sending input to the external device, such as computing device 12. Upon entering this mode, control unit 26 may request a current orientation in which mobile device 20 is physically positioned from orientation sensing unit 24 (82). The request may further cause orientation sensing unit 24 to periodically or continuously determine a physical orientation for mobile device 20, such that orientation sensing unit 24 may trigger an interrupt request upon determining that mobile device 20 has been physically positioned in a new orientation, as described below.

In response to the request for the current orientation, orientation sensing unit 24 may determine a current orientation in which mobile device 20 is currently physically positioned (84). Orientation sensing unit 24 may then send a signal, message, interrupt, or other indication of the current orientation of mobile device 20 (86). In some examples, orientation sensing unit 24 may periodically or continuously determine the orientation of mobile device 20, and simply send the most recently determined orientation of mobile device 20, rather than determining the orientation in response to a request from control unit 26.

After receiving the indication of the current orientation in which mobile device 20 is physically positioned, control unit 26 may select a GUI to display based on the current orientation (88). For example, control unit 26 may query configuration data 28 to determine a GUI that is associated with the current orientation of mobile device 20. Control unit 26 may further cause touchscreen 22 to display the GUI associated with the current orientation of mobile device 20. Control unit 26 may then await user input (90), e.g., a selection of a region of touchscreen 22.

In the example of FIG. 4, it is assumed that the user provides input while mobile device 20 is physically positioned in the same orientation as when the mode for providing input to the external device was entered. Accordingly, control unit 26 receives the user input via touchscreen 22 (92). Furthermore, in the example of FIG. 4, it is assumed that soon after receiving the input from the user (e.g., before the input has been fully processed), the user changes the orientation of mobile device 20. For example, the user may rotate mobile device 20 from portrait to landscape soon after having selected a region of a trackpad GUI displayed while in portrait mode.

While control unit 26 is in the mode for providing input to the external device, orientation sensing unit 24 may periodically or continuously determine a physical orientation for mobile device 20 (96). Likewise, orientation sensing unit 24 may determine whether the current orientation of mobile device 20 is different from the previously determined orientation (98). If not ("NO" branch of 98), orientation sensing unit 24 may again determine the current orientation of mobile device 20 (96), in some examples after waiting a predetermined amount of time. However, if there has been a change in the orientation ("YES" branch of 98), orientation sensing unit 24 may trigger an interrupt to signal the new orientation to control unit 26 (100). Although the example of FIG. 4 is described with respect to the use of interrupts, in other examples, control unit 26 may periodically determine the current orientation of mobile device 20 by executing a polling loop that issues a request to orientation sensing unit 24 for the current orientation.

In the example of FIG. 4, control unit 26 receives the interrupt from orientation sensing unit 24 (102) before fully processing the input received via touchscreen 22. For ease of explanation, the determination of whether an interrupt has been received is illustrated following the act of providing the input to the external device. However, it should be understood that the interrupt may be received before the input has been provided to the external device. Control unit 26 may first provide the input received via touchscreen 22 to the external device (94). To provide the input to the external device, control unit 26 may encapsulate a value representative of a region of touchscreen 22 that was selected in a format based on a communication protocol used to communicate with the external device, e.g., computing device 12.

If an interrupt has not been received from orientation sensing unit 24 ("NO" branch of 102), control unit 26 may again await user input (90). On the other hand, if an interrupt has been received ("YES" branch of 102), control unit 26 may determine a context of an application executed by the external device (104). For example, context determination unit 32 may request an indication of a context for the application from the external device, and after receiving the indication, determine the context and notify control unit 26. The context may be based on a user's interaction with the application via mobile device 20. Control unit 26 may then query configuration data 28 using the determined context for the application and the new orientation to determine an interface to display based on the new orientation and the context, and then change the GUI based on the new orientation and the context (106).

Figure 5:
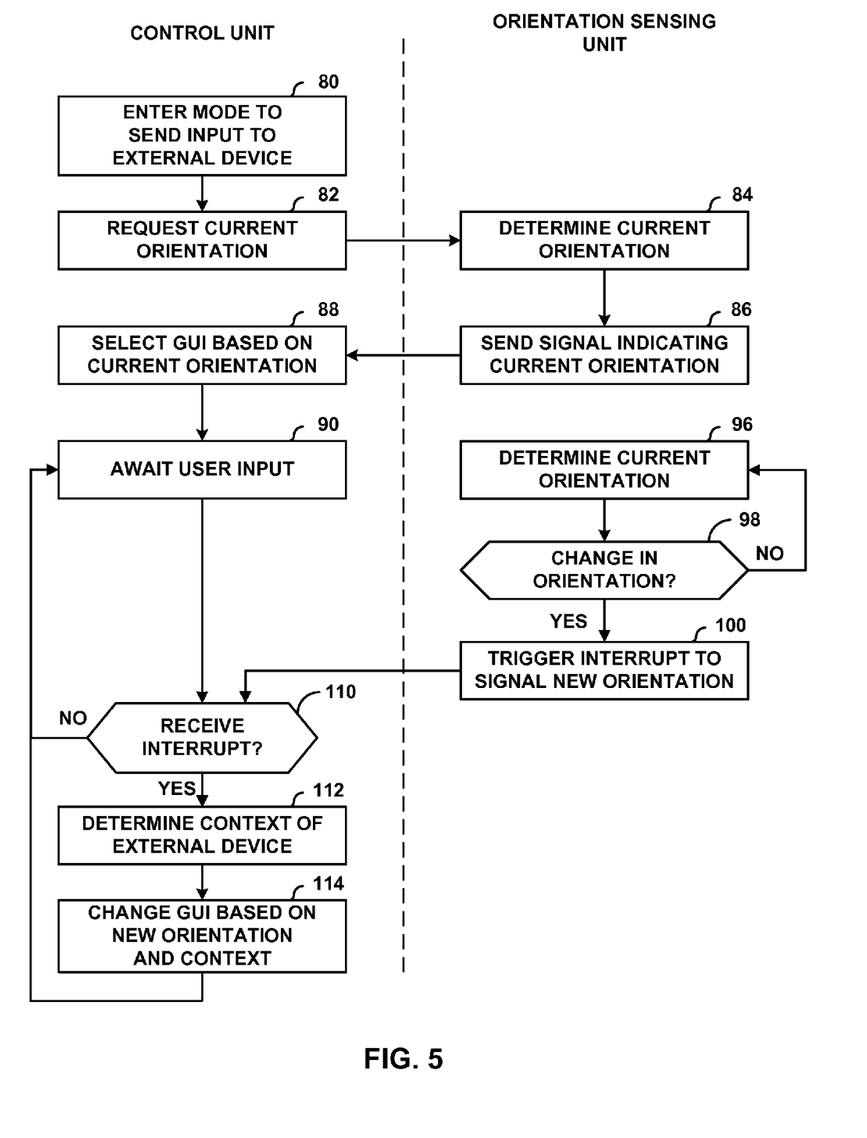
FIG. 5 is a flowchart illustrating an example method for changing a GUI displayed by a touchscreen device when the touchscreen device has changed orientations without having received user input.

FIG. 5 is a flowchart illustrating an example method for changing a GUI displayed by a touchscreen device when the touchscreen device has changed orientations without having received user input. That is, the method of FIG. 5 may correspond to a situation in which the touchscreen device has not received any user input while displaying a first GUI, or may have received and processed user input, and provided the user input to an external device, at a time prior to being rotated to a new orientation. FIG. 5 includes similar steps for control unit 26 and orientation sensing unit 24 up to control unit 26 awaiting user input (90).

In the example of FIG. 5, however, a user rotates or otherwise changes the orientation of mobile device 20 either without or after a sufficiently long period of time from providing input, such that the input may have been fully processed before the change in orientation occurs. Accordingly, following receipt of the interrupt to signal the new orientation from orientation sensing unit 24 (110), control unit 26 may immediately determine the context of the application executed by the external device (112), and change the GUI displayed by touchscreen 22 based on the new orientation of mobile device 20 and the context of the application (114), without needing to process user input received via touchscreen 22.

Figure 6:
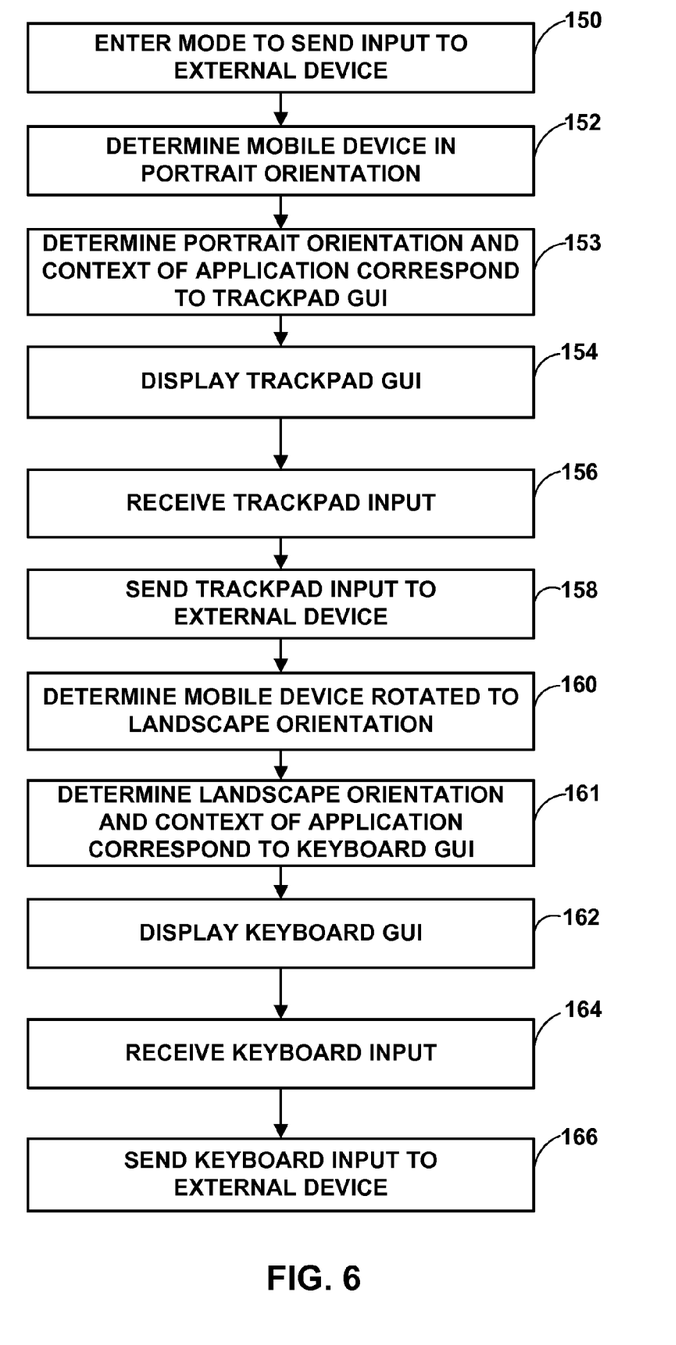
FIG. 6 is a flowchart illustrating an example method of operation of a touchscreen device configured according to one or more of the techniques of this disclosure.

FIG. 6 is a flowchart illustrating an example method of operation of a touchscreen device configured according to the techniques of this disclosure. In this example, it is assumed that mobile device 20 includes configuration data that associates a portrait orientation with a trackpad GUI and a landscape orientation with a keyboard GUI. However, it should be understood that in other examples, mobile device 20 may be configured with additional and/or alternative orientations that may be mapped to additional and/or alternative GUIs or other input modes.

In the example of FIG. 6, mobile device 20 may first enter a mode in which mobile device 20 is configured to provide input to an external device, such as computing device 12 (FIG. 1) (150). In this example, mobile device 20 may determine that mobile device 20 is physically positioned in a portrait orientation (152). Mobile device 20 may further determine a context for the application executed by the external device, and then determine that the portrait orientation when combined with the context indicates that the trackpad GUI should be displayed (153). Thus, in accordance with the configuration of mobile device 20 in this example, mobile device 20 may display a trackpad GUI (154), as the configuration data of mobile device 20 is assumed to associate the portrait orientation and the context of the application with the trackpad GUI in this example.

After displaying the trackpad GUI, mobile device 20 may receive trackpad input (156), e.g., swipes in various directions across touchscreen 22 representative of cursor movements and/or taps or left and right mouse button presses. After receiving the trackpad input, mobile device 20 may send the trackpad input to the external device, e.g., computing device 12 (158). Mobile device 20 may translate swipes into values representative of mouse movements horizontally and vertically and encapsulate the values using a communication protocol, such as, for example, Bluetooth HID. Mobile device 20 may receive and send any amount of trackpad input while in the portrait orientation.

A user may then rotate mobile device 20 to the landscape orientation, and mobile device 20 may accordingly determine that it has been rotated to the landscape orientation (160). Mobile device 20 may further determine a context for the application executed by the external device, and then determine that the landscape orientation when combined with the context indicates that the keyboard GUI should be displayed (161). Thus, mobile device 20 may display the keyboard GUI (162), based on the assumption in this example that the keyboard GUI is associated with the landscape orientation. Likewise, mobile device 20 may receive keyboard input (164) via touchscreen 22 and send values representative of the keyboard input to computing device 12, e.g., encapsulated according to Bluetooth HID protocol.

In this manner, mobile device 20, which may comprise a cellular telephone or other touchscreen device, may act as both a keyboard and a mouse for computing device 12. That is, based on the orientation in which mobile device 20 is physically positioned and a context for an application executed by computing device 12, mobile device 12 may provide the functionality of both a keyboard and a mouse for computing device 12. Thus, when computing device 12 corresponds to a computing device that may not always have a keyboard, mouse, or other input device continuously coupled to it (such as a video game console, a lightweight Internet device coupled to a television display, an administrative device, or other device), a user may still interact with computing device 12 via the user's mobile device, e.g., the user's cellular telephone.

Mobile device 20 may include configuration data that associates orientations in which mobile device 20 may be physically positioned and states for various applications executed by computing device 12 with particular input modes, e.g., particular GUIs. Thus, when mobile device 20 detects that it has been physically positioned to a particular orientation, mobile device 20 may determine the GUI associated with the orientation and the context for the application, e.g., the application state, and display the associated GUI. Furthermore, mobile device 20 may receive particular types of input via the GUI associated with the orientation. Likewise, when mobile device 20 is moved to a different orientation, mobile device 20 may detect the movement, determine the new orientation, determine the GUI or input mode associated with the orientation, and then display the associated GUI or otherwise execute the input mode.

Although the techniques of this disclosure are primarily discussed with respect to associating a GUI with an orientation in which a mobile device may be physically positioned and the context for an application, the term input mode should be understood to include any manner of providing input to a computing device via mobile device 20. For example, mobile device 20 may include or be communicatively coupled to a physical keyboard, a stylus, a light pen, a mouse, a game controller, a microphone, a camera, or other input device, and may enter an input mode to receive input from one or more of these devices when the context for the application combined with the physical position of mobile device 20 in an orientation associated with the device(s).

Figure 7:
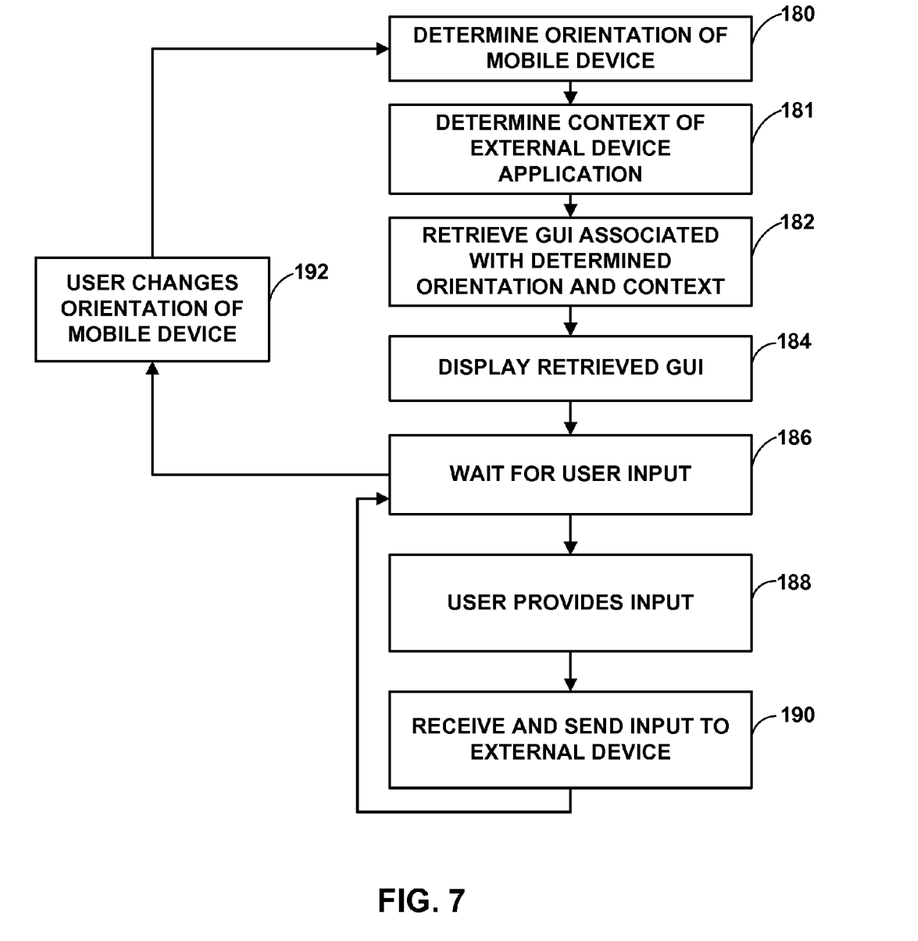
FIG. 7 is a flowchart illustrating another example method for displaying a GUI based on a physical orientation of a mobile device.

FIG. 7 is a flowchart illustrating another example method for displaying a GUI based on an orientation in which a mobile device is physically positioned. In the example of FIG. 7, mobile device 20 may first determine a physical orientation for mobile device 20 (180). Control unit 26 (FIG. 2) of mobile device 20 may then determine a context for an application executed by computing device 12 using context determination unit 32. Next, control unit 26 may retrieve from configuration data 28 a GUI associated with the determined orientation and the context for the application (182). Control unit 26 may then cause touchscreen 22 to display the retrieved GUI (184). Next, control unit 26 may wait for user input (186).

When the user provides input via the GUI displayed by touchscreen 22 (188), control unit 26 may receive the input and send the input to an external device, such as computing device 12 (FIG. 1) (190). Mobile device 20 may then await additional input (186). On the other hand, when the user changes the orientation of mobile device 20 (192), control unit 26 may determine the new orientation (180), determine a context for the application (181), retrieve a GUI associated with the new orientation and the context for the application (182), cause touchscreen 22 to display the GUI (184), and again await user input (186).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media. In general, computer-readable storage media includes tangible, non-transient, non-transitory storage media.

Various examples have been described. These and other examples are within the scope of the following claims.

The invention claimed is:

1. A method comprising:
   determining, by a computing device, a physical orientation of a touchscreen;
   determining, by the computing device, a context for an application executed by an external device to which the computing device is communicatively coupled, wherein the context corresponds to information that is generated based on a user's interaction with the application;
   in response to a determination that the touchscreen is physically oriented in a first orientation and that the context comprises a first context,
      sending, by the computing device, instructions to the touchscreen to display a first graphical user interface configured to receive a first type of user input, and
      upon receiving user input of the first type, providing the received user input of the first type to the external device; and
   in response to a determination that the touchscreen is physically oriented in a second orientation different from the first orientation and that the context comprises a second context,
      sending, by the computing device, instructions to the touchscreen to display a second graphical user interface configured to receive a second type of user input, the second graphical user interface being different than the first graphical user interface, the second type of user input being different than the first type of user input, and
      responsive to receiving user input of the second type, providing the received user input of the second type to the external device.

2. The method of claim 1, further comprising maintaining, by the computing device, configuration data that associates the first graphical user interface with the combination of the first orientation and the first context and that associates the second graphical user interface with the combination of the second orientation and the second context.

3. The method of claim 2, wherein displaying the first graphical user interface comprises:
   querying the configuration data with a value representative of the first orientation and a value representative of the first context; and
   responsive to the query, receiving an indication that the first graphical user interface is associated with the first orientation.

4. The method of claim 2, wherein displaying the second graphical user interface comprises:
   querying the configuration data with a value representative of the second orientation and a value representative of the second context; and
   responsive to the query, receiving an indication that the second graphical user interface is associated with the second orientation.

5. The method of claim 1, further comprising:
   after sending the instructions to the touchscreen to display the first graphical user interface, determining whether the touchscreen has been physically oriented in the second orientation and whether the context for the application has changed to the second context; and
   in response to a determination that the touchscreen has been physically oriented in the second orientation and that the context has changed to the second context, sending instructions to the touchscreen to display the second graphical user interface.

6. The method of claim 1, further comprising:
after sending the instructions to the touchscreen to display the second graphical user interface, determining whether the touchscreen has been physically oriented in the first orientation and whether the context for the application has changed to the first context; and
in response to a determination that the touchscreen has been physically oriented in the first orientation and that the context has changed to the first context, sending instructions to the touchscreen to display the first graphical user interface.

7. The method of claim 1, wherein the first orientation comprises a portrait orientation, wherein the first context comprises a wildcard context, and wherein the first graphical user interface comprises a trackpad graphical user interface.

8. The method of claim 1, wherein the second orientation comprises a landscape orientation, wherein the second context comprises selection of a text field, and wherein the second graphical user interface comprises a keyboard graphical user interface.

9. The method of claim 1, further comprising synchronizing the computing device with the external device to communicatively couple the computing device to the external device in accordance with a wireless communication protocol.

10. A mobile device comprising:
a touchscreen;
an orientation sensing unit configured to determine a physical orientation of the touchscreen;
a context determination unit configured to determine a context of an application executed by an external device to which the mobile device is communicatively coupled, wherein the context corresponds to information that is generated based on a user's interaction with the application;
a non-transitory computer-readable medium configured to store configuration data that associates a number of orientations in which the mobile device can be physically oriented and contexts for one or more applications executed by the external device with respective graphical user interfaces;
a control unit configured to receive from the orientation sensing unit the determined orientation of the touchscreen and to receive the context for the application executed by the external device, select the graphical user interface that is associated with the determined orientation and the context for the application, and instruct the touchscreen to display the selected graphical user interface associated with the determined orientation and the context for the application,
wherein in response to determining that the orientation comprises a first orientation and that the context comprises a first context, the control unit is configured to instruct the touchscreen to display a first graphical user interface configured to receive a first type of user input, and
wherein in response to determining that the orientation comprises a second orientation different from the first orientation and that the context comprises a second context, the control unit is configured to instruct the touchscreen to display a second graphical user interface configured to receive a second type of user input, the second graphical user interface being different than the first graphical user interface, and the second type of user input being different than the first type of user input; and
an external device interface configured to send input received via the selected graphical user interface displayed on the touchscreen to the external device.

11. The mobile device of claim 10, wherein the orientation sensing unit is configured to determine whether the orientation in which the touchscreen is physically oriented has changed, and in response to a determination that the orientation in which the touchscreen has changed to a new orientation, to send an interrupt to the control unit indicative of the new orientation.

12. The mobile device of claim 11, wherein the control unit is configured to receive the interrupt, receive a new context for the application from the context determination unit, select the graphical user interface that is associated with the new orientation and the new context, and cause the touchscreen to display the graphical user interface that is associated with the new orientation and the new context.

13. The mobile device of claim 10, wherein a first entry of the configuration data associates a combination of a landscape orientation and a context comprising a selection of a text field with a keyboard graphical user interface and wherein a second entry of the configuration data associates a portrait orientation with a trackpad graphical user interface and a wildcard value for the context.

14. The mobile device of claim 13,
wherein the control unit is configured to cause the touchscreen to display the keyboard graphical user interface when the orientation sensing unit determines that the physical orientation of the touchscreen comprises the landscape orientation and when the context determination unit determines that the context for the application comprises a selection of a text field, and
wherein the control unit is configured to cause the touchscreen to display the trackpad graphical user interface when the orientation sensing unit determines that the physical orientation of the touchscreen comprises the portrait orientation.

15. A non-transitory computer-readable storage medium comprising instructions that, when executed, cause at least one processor of a mobile device to:
determine a physical orientation for a touchscreen;
determine a context for an application executed by an external device to which the mobile device is communicatively coupled, wherein the context corresponds to information that is generated based on a user's interaction with the application;
in response to a determination that the touchscreen is physically oriented in a first orientation and that the context comprises a first context, send instructions to the touchscreen to display a first graphical user interface configured to receive a first type of user input and upon receiving user input of the first type, the instructions cause the at least one processor to provide the received user input of the first type to the external device; and
in response to a determination that the touchscreen device is physically oriented in a second orientation different from the first orientation and that the context comprises a second context, send instructions to the touchscreen to display a second graphical user interface configured to receive a second type of user input, wherein the second graphical user interface is different than the first graphical user interface and wherein the second type of user input is different than the first type of user input, and upon receiving user input of the second type, the instructions cause the at least one processor to provide the received user input of the second type to the external device.

16. The computer-readable storage medium of claim 15, further comprising instructions to maintain configuration data that associates the first graphical user interface with the combination of the first orientation and the first context and that associates the second graphical user interface with the combination of the second orientation and the second context.

17. The computer-readable storage medium of claim 16, wherein a first entry of the configuration data associates a landscape orientation and a context comprising a selection of a text field with a keyboard graphical user interface and wherein a second entry of the configuration data associates a portrait orientation with a trackpad graphical user interface and a wildcard value for the context.

18. The computer-readable storage medium of claim 15, further comprising instructions to, after sending the instructions to the touchscreen to display the first graphical user interface, determine whether the touchscreen has been physically oriented in the second orientation and whether the context for the application has changed to the second context, and in response to a determination that the touchscreen has been physically oriented in the second orientation and that the context has changed to the second context, to cause the touchscreen to display the second graphical user interface.

19. The computer-readable storage medium of claim 15, further comprising instructions to, after sending the instructions to the touchscreen to display the second graphical user interface, determine whether the touchscreen has been physically oriented in the first orientation and whether the context for the application has changed to the first context, and in response to a determination that the touchscreen has been physically oriented in the first orientation and that the context has changed to the first context, to cause the touchscreen to display the first graphical user interface.

\* \* \* \* \*